UNITED STATES PATENT OFFICE.

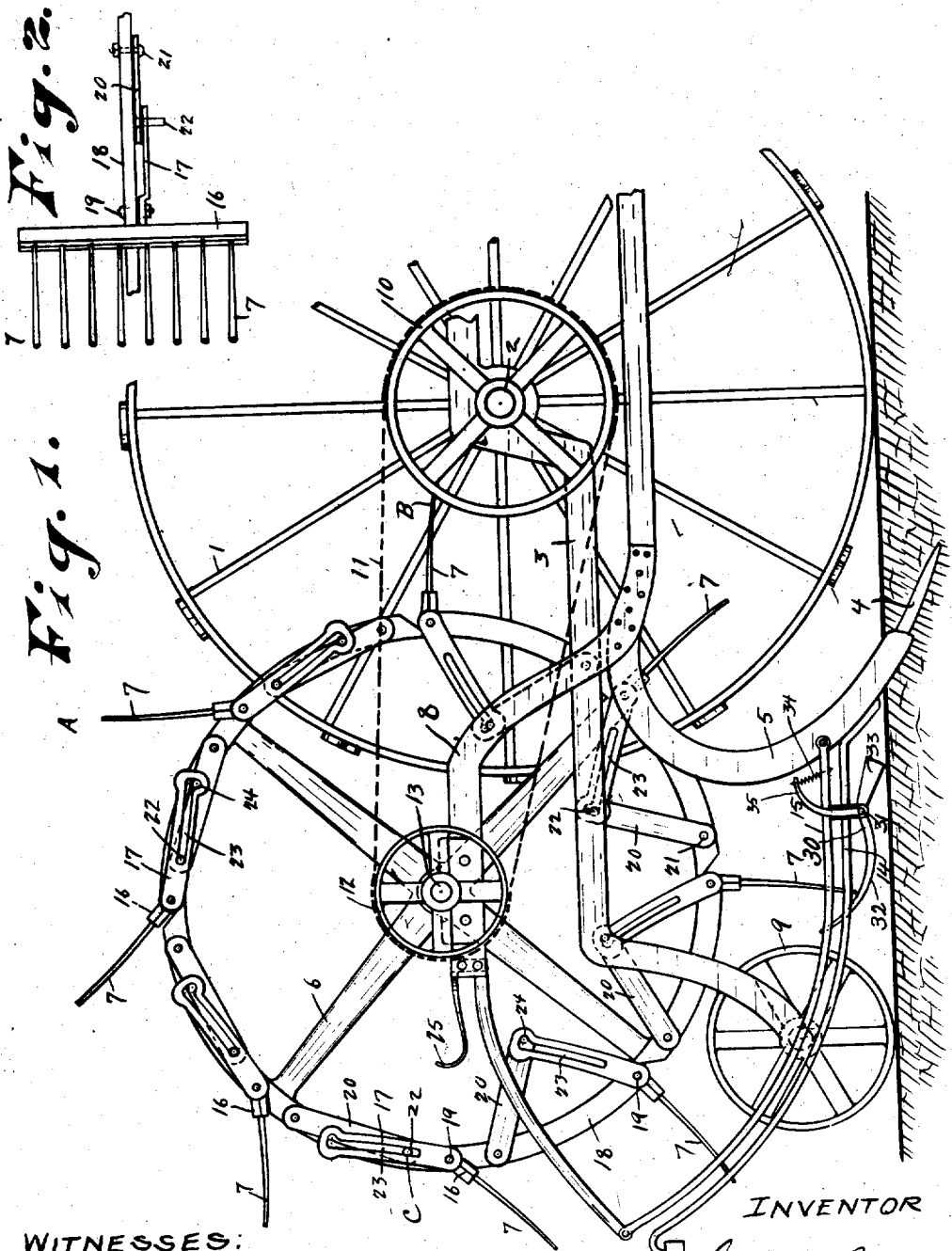

JAMES P. BRENNAN, OF COLUMBUS, WISCONSIN, ASSIGNOR OF ONE-HALF TO HENRY J. WEIDEMANN, OF COLUMBUS, WISCONSIN.

POTATO-HARVESTER.

973,852.

Specification of Letters Patent.  Patented Oct. 25, 1910.

Application filed February 6, 1909. Serial No. 476,565.

*To all whom it may concern:*

Be it known that I, JAMES P. BRENNAN, a citizen of the United States, residing at Columbus, county of Columbia, and State, of Wisconsin, have invented new and useful Improvements in Potato-Harvesters, of which the following is a specification.

My invention relates to improvements in a certain potato harvester for which Letters Patent of the United States No. 829384 were issued to me August 28, 1906 and it pertains more specially to the construction of and means for pivotally supporting the radial fingers of the so called reel, whereby said fingers are rigidly held in place when passing through the lower arc of the circle described by the reel but are adapted to be released from their radial position and be inclined downwardly and rearwardly as they are carried upwardly by such reel.

The construction of my invention is explained by reference to the accompanying drawings in which—

Figure 1 represents a side view of the operative mechanisms of the harvester provided with my improvements. Fig. 2 represents a top view of a series of the radial fingers and their supporting mechanisms.

Like parts are identified by the same reference figures in both views.

In my present invention, the traction wheels 1, wheel supporting axle 2, axle supporting frame 3, excavating blade 4, blade supporting beam 5, reel 6, reel supporting arms 8, frame supporting wheels 9, means for communicating motion from the traction wheels 1 to the reel 6, consisting of the sprocket wheel 10, sprocket chain 11, sprocket wheel 12, reel supporting shaft 13, upon which the reel 6 is mounted, also the potato screen 14, between the bars of which the earth is screened out and separated from the potatoes and the side bars 15, by which the potatoes are retained on the screen bars as they are being elevated from said screen by said fingers, are all constructed and arranged substantially as shown and described in my said patent.

My present invention consists more specially in the construction of the radial fingers 7 and the means of pivotally connecting them with the reel as stated, whereby when passing between the bars of the screen 14 on the lower side of the reel, they are rigidly locked in the radial position shown. When, however, they have passed the screen 14, they are released from their rigidly locked position and caused to incline downwardly as shown, whereby the potato vines, weeds, grass and such other refuse material as may be engaged by said fingers as they pass between the bars of said screen are free to drop therefrom, as the fingers pass beyond the screen and the liability of such refuse matter being retained by such fingers and carried forwardly over the reel as heretofore by the construction shown in said patent is avoided.

It will be understood that a plurality of radial fingers 7 are connected with a single head block 16 and each of said head blocks 16 is provided with an operating arm 17. Said arms 17 are pivotally supported at uniform distances apart around the reel, upon the annular rim 18 by the pivotal bolts 19. It will be understood that the weight of the fingers 7 is such that as they descend upon the front side of the reel they drop forward from the vertical position shown at A to the horizontal position shown at B in Fig. 1, when they are retained in such position radially to the shaft 13, by the link 20, link supporting bolt 21, and slidable bolt 22, which bolt 22 has a longitudinal movement forwardly and backwardly in the slot 23 of the arm 17, whereby as the fingers 7 are brought to said radial position, their further movement is arrested by contact of said bolt 22 with one side of the slot 23. Thus it will be obvious that as the fingers 7 are brought in contact with the potato vines and other substances deposited upon the screen 14, they are rigidly held in place by said links 20 and connecting parts while passing between the bars of said screen. When, however, said fingers have passed beyond the screen, said link 20 is brought in sliding contact with the upwardly curved arm 25, whereby said bolt 22 is forced downwardly and out of the recess 24 into which it is forced by contact of the fingers with the vines upon the screens and is caused to slide downwardly in said slot 23 to the position shown at C in Fig. 1, whereby the fingers 7 are released from the action of said link 20 and permitted to drop when the potato vines and other refuse matter, which has been caught up thereby are free to fall to the ground, as stated. Thus it will be understood that with each revolution of the reel, the series of fingers 7 are locked in their radial position while passing between the bars of the screen and that when they have passed the screen they are automatically released from their locked position and permitted to incline downwardly as stated.

While I have shown and described the reel, the series of fingers and finger supporting heads, the locking and releasing mechanism and other coöperating parts of the reel, as used in connection with a potato harvester, I do not wish to confine or limit myself to the use of the same in connection with a potato harvester only, as it may be used for other similar purposes.

To prevent lumps of dirt and the like from closing the spaces between the fingers of the screen 14 and thereby obstructing the movement of the radial fingers 7 as they enter the spaces between the fingers of the screen 14, I have provided a plurality of two-armed tilting levers 30 which are pivotally supported from the side bars 15 centrally between the fingers of the screen 14 upon the pivotal shaft 31, the rear arm 32 being curved downwardly and upwardly terminating at its rear end slightly above said side bars, while the front end is preferably made triangular in shape terminating downwardly and centrally beneath the bars of the screen 14, as shown in Fig. 1, whereby as the radial fingers 7 of the reel are brought in contact with such obstructions they will be broken and reduced in size, when said arm 32 will tip downwardly and permit said obstructions to escape between the fingers. The short arm 33 of said lever is adapted to be thrown upwardly between the fingers of the screen as the rear end is thrown downwardly, whereby such substances as might otherwise accumulate in the front end of the screen will be thrown rearwardly and past the pivotally supporting rod 31, when they are carried forward by the next succeeding radial fingers 7 of the reel. The two-armed lever 30 is yieldingly retained in its normal position shown by the spring 34, which spring is connected at one end with the side bar 15 and at its opposite end with said rod 31 through the arm 35, which arm 35 is rigidly connected with said pivotal rod 31. Thus it will be obvious that when any of the radial fingers 7 contact with anything supported upon the fingers 14, all the arms 32 of the series will be simultaneously thrown down, while all the rear arms 33 will be thrown upwardly, and that as soon as the fingers 7 have passed said arm 32, said two-armed levers will be brought back to their normal position shown by the re-coil of the spring 34.

Having thus described my invention what I claim as new and desire to secure by Letters Patent is,

1. In a potato harvester of the class described, the combination with a revoluble reel of a plurality of series of fingers pivotally supported from said reel, means for automatically locking said fingers radially to the reel supporting shaft as they pass between the bars of the screen of said harvester and means for automatically releasing said series of fingers and permitting them to incline downwardly after they have passed said screen.

2. In a potato harvester of the class described, the combination of a revoluble reel, a plurality of finger supporting heads, a series of fingers and an operating arm rigidly connected with each of said heads, means for pivotally supporting said arms from said revoluble reel, a link slidably connected at one end with each of said arms and pivotally connected at its opposite end with said reel, the operating arm of said series of fingers being adapted to drop into locking engagement with said links as said fingers pass between the screen bars of the harvester and means for automatically disengaging said locking mechanism and releasing said fingers from their locked position, when they have passed said screen.

In testimony whereof I affix my signature in the presence of two witnesses.

JAMES P. BRENNAN.

Witnesses:
 I. D. BREMER,
 O. R. ERWIN.